United States Patent [19]

Lippert

[11] Patent Number: 5,074,698
[45] Date of Patent: Dec. 24, 1991

[54] JOINT FORK OF A JOINT FOR ADJUSTING LINKAGES

[75] Inventor: Reinhold Lippert, Kirchheim/Teck, Fed. Rep. of Germany

[73] Assignee: Mercedes-Benz AG, Fed. Rep. of Germany

[21] Appl. No.: 642,874

[22] Filed: Jan. 18, 1991

[30] Foreign Application Priority Data

Jan. 31, 1990 [DE] Fed. Rep. of Germany ....... 4002751

[51] Int. Cl.$^5$ ............................................. F16C 11/00
[52] U.S. Cl. ..................................... 403/79; 403/158; 403/131
[58] Field of Search .................. 403/77, 79, 157, 158, 403/131

[56] References Cited

U.S. PATENT DOCUMENTS

| 1,395,871 | 11/1921 | Randall et al. | 403/79 |
| 2,531,326 | 11/1950 | DiPaolo. | |
| 4,226,550 | 10/1980 | Kupcak | 403/157 |

FOREIGN PATENT DOCUMENTS 1343265 1/1974 United Kingdom ............... 403/157

Primary Examiner—Andrew V. Kundrat
Attorney, Agent, or Firm—Evenson, Wands, Edwards, Lenahan & McKeown

[57] ABSTRACT

In a joint fork of a joint for adjusting linkages, the necessary constructional space is kept small by means of a shortened fork shank and a widened threaded bore in the fork shank.

15 Claims, 1 Drawing Sheet

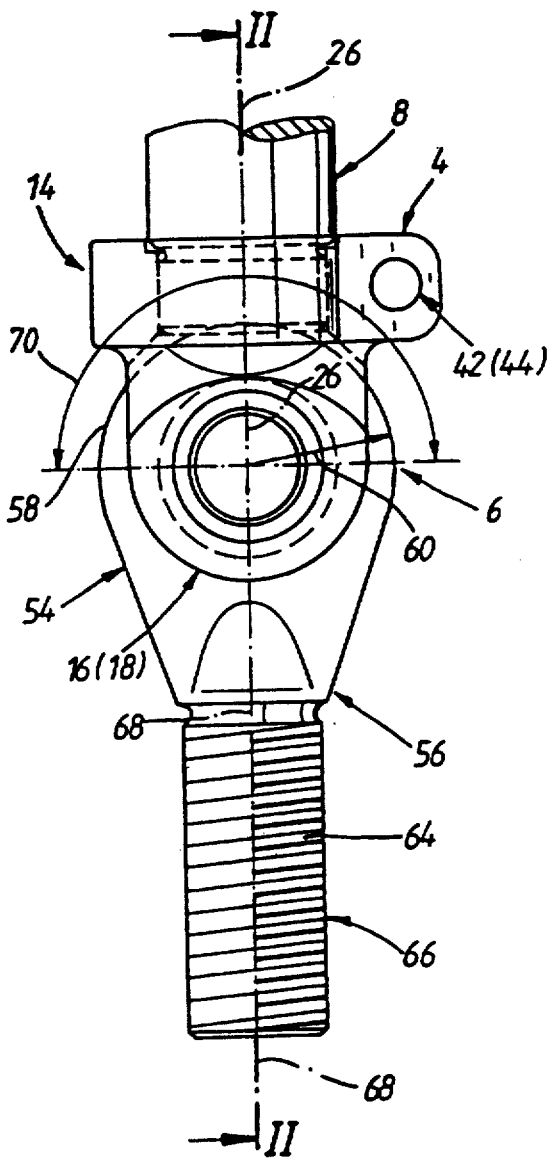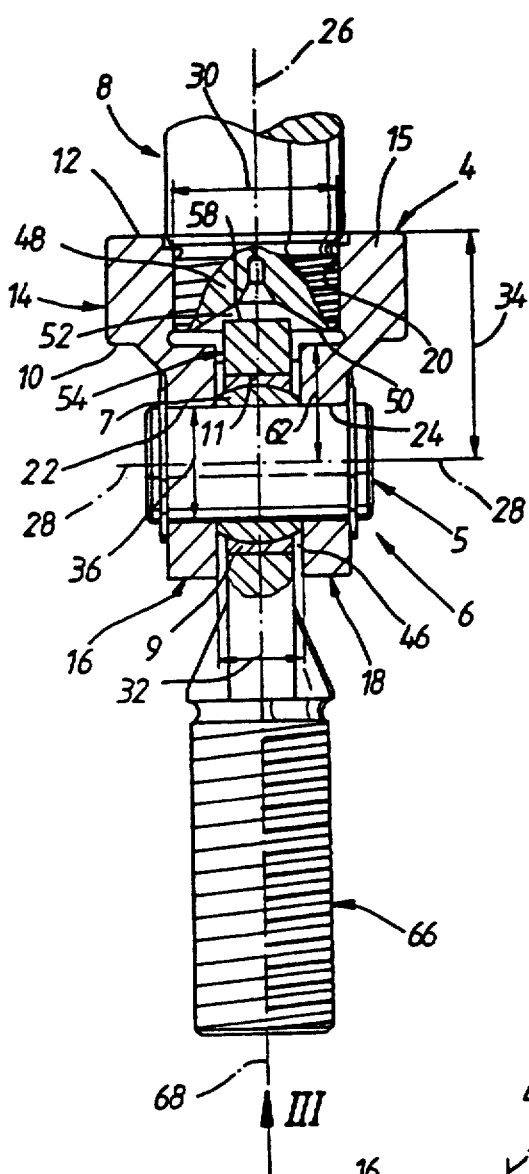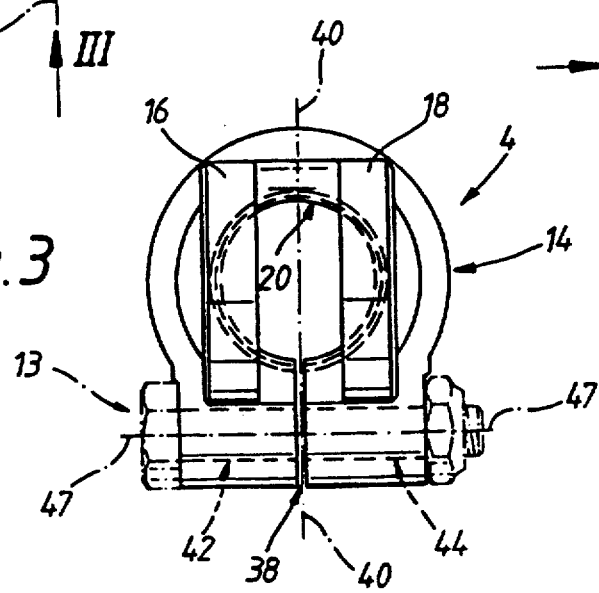

ered in conjunction with the accompanying drawings.

JOINT FORK OF A JOINT FOR ADJUSTING LINKAGES

BACKGROUND AND SUMMARY OF THE INVENTION

The invention relates to a joint fork of a joint for adjusting linkages, with two fork cheeks arranged fixedly in terms of movement at one shank end of a fork shank, in which the fork shank has a central threaded bore and the mutually parallel fork cheeks each have a receiving bore, and the axis of the threaded bore lies both centrally in relation to the fork cheeks and perpendicularly relative to the axis of the mutually aligned receiving bores.

Standardized joint forks of this type (DIN 71 752) are long and narrow in the directions of the fork shank, that is to say perpendicularly to the joint axis, because the clear diameter of the threaded bore is at most equal to, but usually smaller than the clear distance between the fork cheeks, and the distance between the axis of the receiving bores, on the one hand, and the fork-shank end located opposite the fork cheek, on the other hand, amounts to at least four times the clear diameter of a receiving bore.

An object on which the invention is based is essentially, for constructional and kinematic reasons, to keep small the total constructional length of a rack-and-pinion steering with steering-rod connections attached centrally to a piston rod. This object presents itself especially when positional hydraulic circuits necessitate a large constructional length. Under these circumstances, however, standardized fork joints would prevent a motive-circuit rack-and-pinion steering from being used.

According to the invention, this object is achieved in an advantageous way by means of an arrangement wherein the outside diameter of the threaded bore amounts to approximately twice the clear distance between the fork cheeks, and wherein the distance between the axis of the receiving bores, on the one hand, and the other shank end of the fork shank located opposite the fork cheeks, on the other hand, amounts to approximately twice the clear diameter of a receiving bore.

In the joint fork according to the invention or in the joint according to the invention designed with such a joint fork, it is to the advantage of a small constructional length that, among other things, the central threaded bore in the fork shank has a short thread length and a wide thread diameter, the threaded connection can be secured by jamming the slotted fork shank by means of a clamping screw, the strength of the fork shank is guaranteed by utilizing the thread run-out and the chamber of the trunnion of the respective linkage part for the shank length, and a further reduction of the constructional length becomes possible if the cylindrical outer face of the bearing lug penetrates into the wide recess made possible by the wide thread diameter on the end face of the trunnion.

Other objects, advantages and novel features of the present invention will become apparent from the following detailed description of the invention when considered in conjunction with the accompanying drawings.

BRIEF DESCRIPTION OF THE DRAWINGS

FIG. 1 shows a side view of a joint constructed according to the invention, the axes of the two joint halves lying in one plane together with the joint axis;

FIG. 2 shows the joint of FIG. 1 in a section along the line II—II of FIG. 1; and FIG. 3 shows a joint fork as an individual part of one joint half of the joint of FIG. 1 in a view in the direction of the arrow III in FIG. 2.

DETAILED DESCRIPTION OF THE DRAWINGS

A piston rod 8 of a pressure-medium actuator of the axial-piston type, not shown in any more detail, possesses, at its outer end projecting from the working cylinder receiving the axial-piston, a trunnion 48 which is screwed into a central threaded bore 20 of a cylindrical fork shank 14 of a joint fork 4 of a joint 6. While the threaded bore 20 opens into one end face 12 of a fork shank 14 confronting the piston rod 8, the other end of the threaded bore 20 is at a specific distance 62 from an axis 28—28 which is perpendicular to the axis 26—26 of the fork shank 14. From the other end face 10 of the fork shank 14 extend two parallel fork cheeks 16 and 18 which are symmetrical relative to the axis 26—26 and which each have a receiving bore 22, 24 of an axis aligned with the axis 28—28.

The outside diameter 30 of the threaded bore 20 amounts to approximately twice the clear distance 32 between the fork cheeks 16 and 18. The distance 34 between the axis 28—28 and the end face 12 of the fork shank 14 is likewise calculated to be approximately twice as large as the clear diameter 36 of the receiving bores 22, 24. The interspace 46 enclosed by the fork cheeks 16 and 18 is open towards the threaded bore 20.

Inserted into the receiving bores 22, 24 is a pivot pin 5 which is fixed immovably relative to the fork cheeks 16, 18 by means of retaining rings inserted into pin grooves.

Arranged fixedly in terms of movement on the pivot pin 5 is a joint ring 7 which is located in the interspace 46 and has an outer spherical bearing surface and which interacts by means of a ball socket 9 with a corresponding spherical bearing surface. The ball socket 9 is itself retained fixedly in terms of movement in a cylindrical receptacle 11 of a bearing lug 54.

While the joint fork 4 with the pivot pin 5 and the joint ring 7 form essentially one joint half of the joint 6, the bearing lug 54 with the ball socket 9 is part of the other joint half 56 which essentially also includes a connecting pin 66 equipped with an external thread 64.

The bearing lug 54 has a cylindrical outer shell surface 58 which is central in relation to the axis 28—28 and which has a radius 60 larger than the distance 62. To make this design possible, the end face 50 of the trunnion 48 has a central recess 52, into which the bearing lug 54 penetrates with its outer shell 58.

The screw connection between the fork shank 14 and the trunnion 48 can be secured by means of a clamping screw 13 indicated by dot-dash line. For this purpose, the fork shank 14 possesses, at a point on its annular cross-section 15, a slot 38 which is arranged centrally in relation to a plane 40—40 containing the axis 26—26 of the threaded bore 20. The fork shank 14 has two passage bores 42 and 44 for the clamping screw 13 which are located on both sides of the slot 38 and which are each open towards the slot 38, these passage bores 42 and 44 having a common axis 47—47 directed perpendicularly relative to the plane 40—40 and being arranged eccentrically relative to the threaded bore 20.

The outer shell surface 58 extends over a circumferential angle 70 of approximately 180° and is arranged diametrically and symmetrically in relation to the connecting pin 66, the axis 68—68 of which is itself perpendicular to the axis 28—28 of its bearing lug 54.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Joint apparatus comprising a joint fork of a joint for adjusting linkages, with two fork cheeks arranged fixedly in terms of movement at one shank end of a fork shank, in which the fork shank has a central threaded bore and the mutually parallel fork cheeks each have a receiving bore, and the axis of the threaded bore lies both centrally in relation to the fork cheeks and perpendicularly relative to the axis of the mutually aligned receiving bores, wherein the outside diameter of the threaded bore amounts to approximately twice the clear distance between the fork cheeks, and wherein the distance between the axis of the receiving bores, on the one hand, and the other shank end of the fork shank located opposite the fork cheeks, on the other hand, amounts to approximately twice the clear diameter of a receiving bore.

2. Joint apparatus according to claim 1, wherein the fork shank has a slot, the mid-plane of which contains the axis of the threaded bore.

3. Joint apparatus according to claim 2, wherein the fork shank has two aligned passage bores which are located on both sides of the slot and which open into the slot at one bore end and are arranged eccentrically relative to the threaded bore.

4. Joint apparatus according to claim 3, wherein the axis of the passage bores is perpendicular to the mid-plane of the slot.

5. Joint apparatus according to claim 1, wherein the interspace enclosed by the fork cheeks is open towards the threaded bore.

6. Joint apparatus according to claim 4, wherein the interspace enclosed by the fork cheeks is open towards the threaded bore.

7. Joint apparatus according to claim 1, further comprising a trunnion screwable into the threaded bore and belonging to a linkage part, said trunnion having a central recess on its end face.

8. Joint apparatus according to claim 7, wherein a bearing lug arranged centrally and pivotally relative to the axis of the receiving bores and spacially between the fork cheeks and belonging to a second joint half is equipped with a cylindrical outer shell surface which both is arranged centrally relative to the axis of the bearing lug and has a radius larger than the distance between the axis of the receiving bores on the one hand and the threaded bore on the other hand.

9. Joint apparatus according to claim 8, wherein the second joint half has a connecting pin which is equipped with a thread and which is connected rigidly to the bearing lug at one pin end, and wherein the axes of the bearing lug and connecting pin are perpendicular to one another.

10. Joint apparatus according to claim 4, further comprising a trunnion screwable into the threaded bore and belonging to a linkage part, said trunnion having a central recess on its end face.

11. Joint apparatus according to claim 10, wherein a bearing lug arranged centrally and pivotally relative to the axis of the receiving bores and spacially between the fork cheeks and belonging to a second joint half is equipped with a cylindrical outer shell surface which both is arranged centrally relative to the axis of the bearing lug and has a radius larger than the distance between the axis of the receiving bores on the one hand and the threaded bore on the other hand.

12. Joint apparatus according to claim 11, wherein the second joint half has a connecting pin which is equipped with a thread and which is connected rigidly to the bearing lug at one pin end, and wherein the axes of the bearing lug and connecting pin are perpendicular to one another.

13. Joint apparatus according to claim 8, wherein the cylindrical outer shell surface extends over a circumferential angle of approximately 180° and is arranged diametrically relative to a connecting pin.

14. Joint apparatus according to claim 9, wherein the cylindrical outer shell surface extends over a circumferential angle of approximately 180° and is arranged diametrically relative to the connecting pin.

15. Joint apparatus according to claim 11, wherein the cylindrical outer shell surface extends over a circumferential angle of approximately 180° and is arranged diametrically relative to the connecting pin.

* * * * *